US008940076B2

United States Patent
Duarte-Escareño et al.

(10) Patent No.: US 8,940,076 B2
(45) Date of Patent: Jan. 27, 2015

(54) METHOD FOR PRODUCING DIRECT REDUCED IRON WITH LIMITED $CO_2$ EMISSIONS

(75) Inventors: Pablo Enrique Duarte-Escareño, Monterrey (MX); Eugenio Zendejas-Martinez, Monterrey (MK); Andrea Tavano, Tavagnacco (IT); Alessandro Martinis, Pozzuolo del Friuli (IT); Omar Della Gaspera, Fontanafredda (IT)

(73) Assignees: HYL Technologies, S.A. DE C.V., San Nicolas de los Garza, NL (MX); Danieli & C. Officine Meccaniche, S.p.A., Buttrio, UD (IT)

( * ) Notice: Subject to any disclaimer, the term of this patent is extended or adjusted under 35 U.S.C. 154(b) by 266 days.

(21) Appl. No.: 13/388,287

(22) PCT Filed: Jul. 21, 2010

(86) PCT No.: PCT/IB2010/001813
§ 371 (c)(1),
(2), (4) Date: Jan. 31, 2012

(87) PCT Pub. No.: WO2011/012964
PCT Pub. Date: Feb. 3, 2011

(65) Prior Publication Data
US 2012/0125157 A1 May 24, 2012

Related U.S. Application Data

(60) Provisional application No. 61/230,675, filed on Jul. 31, 2009.

(51) Int. Cl.
| C21B 13/00 | (2006.01) |
| F27D 17/00 | (2006.01) |
| C21B 13/02 | (2006.01) |
| B01D 53/14 | (2006.01) |
(Continued)

(52) U.S. Cl.
CPC ............ *C21B 13/02* (2013.01); *B01D 53/1475* (2013.01); *B01D 53/228* (2013.01);
(Continued)

(58) Field of Classification Search
CPC .. B01D 53/1475; B01D 53/228; B01D 53/75; B01D 2257/502; B01D 2257/702; C21B 13/02; C21B 2100/02; C21B 2100/04; Y02C 10/10; Y02C 20/10
USPC ...................... 75/505, 495, 796, 497; 95/204; 266/197, 156
See application file for complete search history.

(56) References Cited

U.S. PATENT DOCUMENTS

| 5,110,350 | A | 5/1992 | Villarreal-Trevino et al. |
| 8,377,417 | B2 * | 2/2013 | Metius et al. ................. 423/650 |
| 2003/0047037 | A1 | 3/2003 | Sethna et al. |

FOREIGN PATENT DOCUMENTS

| WO | WO 97/07247 | 2/1997 |
| WO | WO 2010/042023 | 4/2010 |

*Primary Examiner* — George Wyszomierski
*Assistant Examiner* — Tima M McGuthry Banks
(74) *Attorney, Agent, or Firm* — A. Thomas S. Safford; Frommer Lawrence & Haug, LLP

(57) ABSTRACT

Production method and apparatus for direct reduced iron (DRI), a.k.a sponge iron, by contacting iron oxides with recycled and regenerated hot reducing gases containing $H_2$ & $CO_2$. This invention decreases uncontained emission of $CO_2$ to the atmosphere from combustion of carbon-bearing fuels in the reducing-gas heater by substituting, at least partially, a gas mainly comprising hydrogen in lieu of the usual carbon-bearing fuels. The hydrogen fuel stream, depleted of $CO_2$ by means of a physical gas separation unit (which can be a PSA/VPSA type adsorption unit, a gas separation membrane unit or a combination of both such units) is derived from at least a portion of regenerated reducing gases being recycled to the reduction reactor. The derived hydrogen fuel stream is combusted in the reducing gas heater and/or other thermal equipment in the reduction plant, thus decreasing the $CO_2$ emissions directly to the atmosphere.

22 Claims, 5 Drawing Sheets

(51) Int. Cl.
*B01D 53/22* (2006.01)
*B01D 53/75* (2006.01)
*B01D 53/047* (2006.01)

(52) U.S. Cl.
CPC ............ *B01D 53/75* (2013.01); *B01D 53/047* (2013.01); *B01D 2257/502* (2013.01); *B01D 2257/702* (2013.01); *C12B 2100/02* (2013.01); *C21B 2100/04* (2013.01); *Y02C 10/06* (2013.01); *Y02C 10/08* (2013.01); *Y02C 20/20* (2013.01); *Y02C 10/10* (2013.01)
USPC ................ 75/495; 75/497; 75/505; 952/204; 266/197; 266/156

METHOD FOR PRODUCING DIRECT REDUCED IRON WITH LIMITED $CO_2$ EMISSIONS

FIELD OF THE INVENTION

The present invention relates to a process for reducing particulate iron ore to direct reduced iron (DRI), also known as sponge iron, by means of direct contact with a stream of recirculated and regenerated hot reducing gases obtained from natural gas converted into hydrogen and carbon monoxide. More particularly the invention provides a way for decreasing emission of the $CO_2$ by-product to the atmosphere when using carbon bearing fuels.

BACKGROUND OF THE INVENTION

DRI is a solid granular material which is produced by reacting iron ores (mainly iron oxides in the form of lumps, concentrated pellets or mixtures thereof) with a reducing gas, composed principally of hydrogen and carbon monoxide, at a temperature in the range of 750 to 1100° C.

Typical DRI production facilities are disclosed for example in U.S. Pat. Nos. 3,779,741; 3,765,872; 4,150,972; 4,336,063; 4,834,792; and 5,078,787. Such systems commonly comprise vertical flow reactors having a reduction zone in the upper portion thereof wherein the hot reducing gas flows upwardly counter-current to a descending body of iron ore, and optionally a cooling zone in which the reduced ore (DRI) in the form of sponge iron is cooled with a cooling gas. Alternatively, the DRI is directly hot discharged from the reactor and fed to a DRI melting furnace or to a separate cooling vessel.

The reducing gas is generally obtained by reformation of natural gas in an external catalytic reformer (see for example U.S. Pat. Nos. 3,765,872 and 4,150,972) or, more advantageously, inside the reduction reactor by exploiting the DRI as an effective reformation catalyst (see U.S. Pat. Nos. 4,336,063, 4,668,284 and 5,110,350).

The external catalytic reformer comprises a bank of catalyst-filled tubes located in a heating chamber. Said tubes are externally heated by hot combustion products (including $CO_2$ in significant amount) released by the burners and finally vented into the atmosphere via an exhaust stack.

The reducing gas, introduced into the reactor in the lower part of the reduction zone, is subsequently removed from the top of the reducing zone and divided in two streams: the majority is treated to be upgraded by eliminating most of the reduction reaction by-products (carbon dioxide and water), while the small remainder stream is purged sufficiently to prevent accumulation of inert gases (like $N_2$) in the system and typically can be used as a heating fuel.

It has long been known in the art how to remove water and carbon dioxide to upgrade the spent reducing gas. In particular, U.S. Pat. Nos. 2,547,685, 4,001,010; 4,129,281; 3,853,538; and 4,046,557 teach the removal of the water by quench cooling and of the $CO_2$ by chemical absorption in a unit where the $CO_2$ containing gas is contacted with a liquid solution which reacts with said $CO_2$, leading to a pure $CO_2$ off-gas stream leaving the plant.

When an external catalytic reformer is used, the upgraded reducing gas stream, after being combined with the make up of reformed gas, is heated in a gas heater and finally recycled back into the reduction reactor wherein, as previously indicated, the reduction reaction takes place.

In a Zero-Reformer Plant, i.e. a plant without an external reformer, the upgraded reducing gas stream, now largely depleted of $CO_2$, is finally fed to the reduction reactor after being saturated with hot water, which may be taken from the off gas cooler as suggested in U.S. Pat. No. 5,110,350. The water content in the recycle reducing gas stream promotes auto-reforming of the natural gas previously fed into the stream of the upgraded reducing gas. The mixture of natural gas, water and recycled gas is subsequently heated in a gas heater (typically assisted by an $O_2$ injection to achieve a higher temperature) and fed into the reduction reactor wherein, as previously indicated, the reformation and reduction reactions simultaneously take place.

Alternatively, $CO_2$ can be removed from a mixture of gases by using a physical adsorption system of the PSA or VPSA type (exemplary patents are U.S. Pat. Nos. 3,788,037; 4,869,894; 4,614,525; 5,026,406; 5,152,975; 5,833,734; 5,858,057 and 6,027,545) or by other means known in the industry.

U.S. Pat. No. 6,027,545 is the first to suggest applying this technology in a direct reduction plant. However, in the method disclosed by this patent, there is no selective $CO_2$ removal by a chemical absorber system. Also, the PSA system is not used to separate the $CO_2$ from the majority of the spent gas stream that is recycled, but instead is used to recover a high purity hydrogen stream from the relatively small amount of gas that is purged and subsequently recycles back the separated $H_2$ so as to be added to and used as part of the recycled reducing gas (and not as a heater fuel gas).

U.S. Pat. No. 6,562,103 discloses a direct reduction process incorporating a PSA unit for the removal of carbon dioxide from the spent reducing gas. This patent however teaches only a particular way of purging the PSA units but does not teach nor suggest treating the tail gas 60 which will be burned in the heater 72 so that only hydrogen would be burned in the heater (to the substantial exclusion of the rest of carbon-containing gases, mainly CO and $CH_4$). Consequently, the $CO_2$ produced by burning the carbon-containing tail gas 60 and the natural gas 64 will be released uncontrolled to the atmosphere (and will not be selectively separated in a chemical $CO_2$ removal plant).

Thus, in a typical direct reduction plant, the main emission sources of $CO_2$ are located (1) in the absorber column of the $CO_2$ removal plant (characterized as a selective $CO_2$ emission) and (2) in the process gas heater stack (characterized as a non-selective $CO_2$ emission). In addition, when an external catalytic reformer is used as the reducing make up gas source, an additional non-selective emission of $CO_2$ will issue from the reformer stack.

As a consequence of the increasing concern about the greenhouse effect attributed to the increased presence of $CO_2$ in the atmosphere, measures have to be considered to limit the consequences of this problem in the world. A first measure is essentially to reduce the $CO_2$ emissions to the atmosphere. For this reason, DRI producers are facing the necessity to develop direct reduction processes where the $CO_2$ emissions to the atmosphere are significantly decreased.

The objects of the invention are achieved by providing a method for the direct reduction of iron ores which comprises a chemical absorption system, to extract a stream of almost pure $CO_2$ from the spent gas removed from the reactor, the heater, and the reformer resulting in use mainly of hydrogen as the fuel for the burners: in this way essentially a carbon free emission is released from the reformer and/or the heater stack.

The only carbon-containing fuel burned in the heater and/or the reformer, which involves the release of $CO_2$ after combustion reactions therein, is a small amount of reducing gas; comprising CO, $CO_2$ and $CH_4$, necessarily removed from the system to purge inert elements (like nitrogen) which otherwise accumulate continuously, and, if needed, a minimum stream of natural gas required to produce a visible flame that allow safe monitoring of burner ignition.

Moreover, this invention suggests producing the hydrogen required as fuel from the reduction system itself. In particular, a physical adsorber system of the PSA type is used to recover hydrogen from a portion of the gas stream previously upgraded by the chemical $CO_2$ absorber plant. Hydrogen separation may also be carried out by other means, for example by gas separation membranes; including optionally a combination of the PSA/VPSA and gas membrane systems. Furthermore, it is clear that neither the PSA/VPSA system and/or the gas membrane system are installed alone or in combination as an alternative of the chemical absorption system mentioned above, but is/are additional units, located offline of the process gas recycle circuit, whose aim is treating an offline portion of the process gas, to recover pure hydrogen for burner combustion and thus to permit rejection back to the process gas recycle circuit the other carbon-containing elements.

In this way, a large portion of the $CO_2$ production from the heater and reformer burners (now mainly fed with hydrogen instead of carbon bearing fuels) is automatically diverted to the chemical absorption unit where almost all the $CO_2$ will be withdrawn from the DRI reduction system in a contained manner as pure technical gas.

This invention can be usefully incorporated to a reduction system both with an external reformer and a Zero Reformer. Nevertheless, it is clear that a Zero Reformer system, where an external reformer is not required, is preferable, because the amount of hydrogen used as fuel has to be sufficient only for the heater burners.

Documents cited in this text (including the foregoing listed patents), and all documents cited or referenced in the documents cited in this text, are incorporated herein by reference. Documents incorporated by reference into this text or any teachings therein may be used in the practice of this invention.

OBJECTS OF THE INVENTION

It is therefore an object of the present invention to provide a method and apparatus for producing DRI with decreased $CO_2$ emissions escaping, unrestricted, into the atmosphere.

It is another object of the invention to maximize the selective removal of the $CO_2$ from the spent gas effluent stream and consequently to minimize the non-selective $CO_2$ produced by the reformer and/or heater burners (accomplished according to the present invention by using mainly hydrogen as the combustion fuel).

It is a further object of the invention to provide a method and apparatus for increasing (theoretically to 100%) the selective $CO_2$ absorption in a DR plant.

It is still a further object of the invention to reduce the non-selective $CO_2$ emission produced in the heater and reformer burners. In particular, the selective $CO_2$ emission is a stream of pure $CO_2$ which can be confined or, thanks to its purity, can be used as technical gas in other industrial processes instead of being vented unrestricted into the atmosphere.

SUMMARY OF THE INVENTION

The objects of the invention are achieved by providing a method and apparatus of producing DRI in a direct reduction system comprising a reduction reactor, a gas cooling unit, a selective carbon dioxide absorption unit and a reducing gas heater. Iron-oxides-containing particles are reduced to DRI containing metallic iron, by reaction with a high temperature reducing gas mainly composed of hydrogen and carbon monoxide; wherein spent gas effluent from said reactor is cleaned and cooled in said gas cooling unit whereby water is condensed and withdrawn from said spent gas. The cleaned and cooled reducing gas is treated in said selective carbon dioxide removal unit producing a stream of almost pure carbon dioxide which can be controllably withdrawn from the reduction plant; thus producing an upgraded reducing gas, mainly comprised of hydrogen, carbon monoxide and methane. A first portion of said upgraded reducing gas is recycled to the reactor after being heated in said reducing gas heater, and a second portion of said upgraded reducing gas is treated in a physical adsorption unit to produce a first gas stream mainly composed of hydrogen and a second gas stream mainly composed of carbon monoxide and methane. The first gas stream mainly composed of hydrogen is burned as fuel in said process gag heater and the second gas stream, containing CO and $CH_4$, is recycled to the reduction system whereby any $CO_2$ produced from these carbon-bearing gases is eventually withdrawn from the system in said selective carbon dioxide removal unit. In this way, the hydrogen-containing first gas stream is burned in the process gas heater instead of a carbon-bearing fuel and thus decreases the carbon dioxide emissions released uncontained into the atmosphere from said direct reduction plant.

DETAILED DESCRIPTION OF PREFERRED EMBODIMENTS OF THE INVENTION

Some embodiments of the invention will be described with reference to FIGS. 1 to 6 wherein like numerals in general designate like elements for simplicity of reference to all figures.

Figure 1:
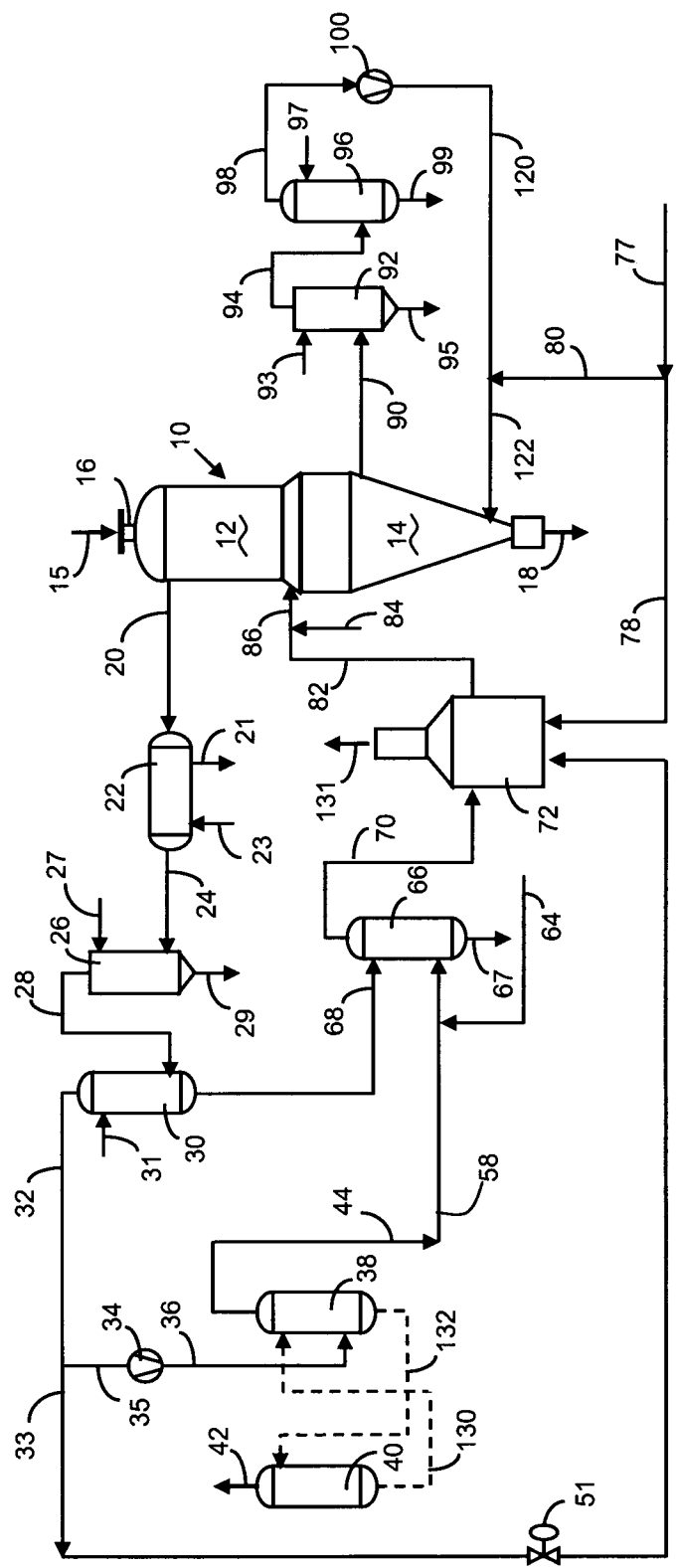
FIG. 1 shows a process diagram of a prior art direct reduction process included for ease of comparison to the invention (see for example U.S. Pat. No. 5,110,350).

FIG. 1 shows a Zero Reformer Direct Reduction System as currently practiced, where numeral 10 generally designates a vertical shaft, moving bed, iron ore gaseous reduction reactor to which iron ore 15 is fed through at least one inlet 16 in the form of lumps, pellets, or any blend thereof.

The iron ore descends by gravity through the reactor 10 in counter-current contact with a reducing gas at high temperature. This reducing gas is introduced to the reactor as gas stream 86, located in the lower part of the reduction zone 12, and is removed as a reacted gas stream 20 from the top of the reactor at a temperature ranging from 300° C. to 450° C. This reacted gas stream 20, with a partially depleted reducing capacity, passes through to a heat exchanger 22 (where heat removed from said stream 20 is recovered, for example, to produce steam or to preheat cold reducing gas by feeding a cold stream 23 to the heat exchanger which exits as a hot stream 21).

After passing through heat exchanger 22, the partially-cooled spent gas 24, is conducted to a cleaning station 26, where entrained dust is removed by contact with a water stream 27 withdrawn as stream 29, and the effluent clean gas 28 is then passed to a cooling station 30, usually of the direct contact type, where the water by-product of the reduction reaction is condensed by contact with water 31 and then removed from the reducing gas as water stream 68.

The cleaned and cooled resulting spent gas stream 32 is divided, with a small first portion 33 containing CO, $CO_2$, $H_2$, and methane, being is purged from the system as tail gas (which may be used as fuel in the gas heater 72). The other major portion 35 of the cool gas stream 32 is subsequently pressurized by compressor 34 before being fed, as stream 36, to an absorber column 38 of a $CO_2$ chemical absorption removal system, for example using an amine solvent. In this way, the $CO_2$ produced by the reduction reactions is selectively separated from said gas stream 36 and chemically absorbed in the lean amine solution 130. Such hot absorbent solution 130, from the bottom of column 40, flows to the top of the absorber 38 and moves downwardly through the column counter-current to the spent gas, absorbing $CO_2$ in a manner known in the art. The $CO_2$-rich solution 132 exits the bottom of absorber column 38 and is fed to the stripper column 40. A stream 42 of almost pure $CO_2$ is extracted from the top of said stripper column 40, while the resulting upgraded reducing gas 44 is removed from the top of said absorber 38. The $CO_2$ from stream 42 can be used in other industrial processes or can be sequestrated into underground locations or otherwise confined so that this stream is not emitted to the atmosphere, thus contributing to the preservation of the environment and compliance with any environmental regulations applicable to the operation of the reduction plant.

Stream 44/58 is further combined with a make-up stream of natural gas 64 and then is fed to humidifier 66 where its water content is adjusted so that the amount of water is between 3% and 10% by volume of stream 70, suitable to carry out reformation of methane and any other hydrocarbons contained in said stream 70 within the reduction zone 12 (as described in more detail in U.S. Pat. No. 5,110,350). To this end, water stream 68 effluent from gas cooler 30 is used to saturate the reducing gas and the excess water exits the humidifier as stream 67.

The humidified reducing gas stream 70 is subsequently heated in heater 72, where the gas reaches a temperature around 900° C. or more as reducing gas stream 82. After that, an injection of oxygen 84 can be added for further increasing the gas temperature to levels above 1000° C., for a more efficient reduction or iron oxides and, at the same time, for carrying out a reforming partial oxidation of the hydrocarbons present in said reducing gas, thus increasing the reducing capacity of the recycled reducing gas.

Figure 3:
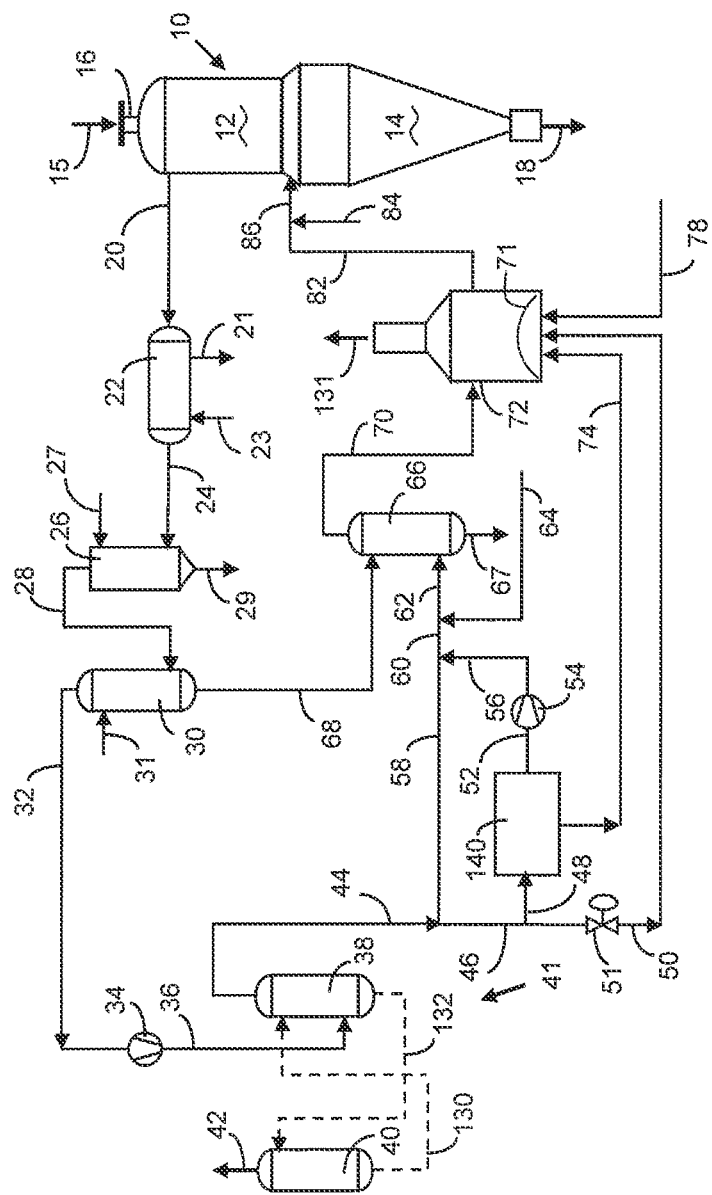
FIG. 3 shows a process diagram of a direct reduction process incorporating another embodiment of the invention, similar to FIG. 2 but without a DRI cooling zone wherein the DRI is discharged at high temperature.

The DRI 18 produced in the reduction zone 12 may be discharged at high temperatures in the order of 400° C. to 750° C., as shown in FIG. 3 or can subsequently be cooled down to a temperature that allows to discharge and store it in contact with atmospheric air (preferably below 100° C.) avoiding its re-oxidation.

Cooling of the DRI is effected by passing a cooling gas stream 122 at a relatively low temperature upwardly through the lower discharge zone 14 of reactor 10 whereby the cooling gas temperature is increased and the temperature of the sponge iron is lowered. The gas used as coolant is usually a carbon-containing gas, for example natural gas or a reducing gas, which cracks as it passes over the hot sponge iron and deposits carbon thereon. In this way, by choosing the right gas composition, it is possible to achieve the desired degree of carburization. The spent cooling gas 90 may be cooled down and recycled in a manner well known in the art. Briefly, the warmed up gas, withdrawn from the top of the cooling zone as stream 90, is further treated in a cleaning station 92 to remove dust by contact with water stream 93 which exits as stream 95, and the clean gas stream 94 is then further cooled-down in a cooling station 96, where it is essentially completely dewatered and cooled down by contact with water stream 97 which is discharged as water stream 99, before being recycled as gas stream 98 by means of a compressor 100 in the closed cooling circuit. A make-up stream of cooling gas 80, preferably natural gas from a suitable source 77, is combined with stream 120 and recycled as cooling gas 122 to the discharge zone 14.

In this prior art process, there are $CO_2$ emissions to the atmosphere through the heater stack 131 as a result of the combustion of natural gas stream 78 and tail gas stream 33, which can be on the order of 169 kg of $CO_2$ per metric ton of DRI.

Figure 2:
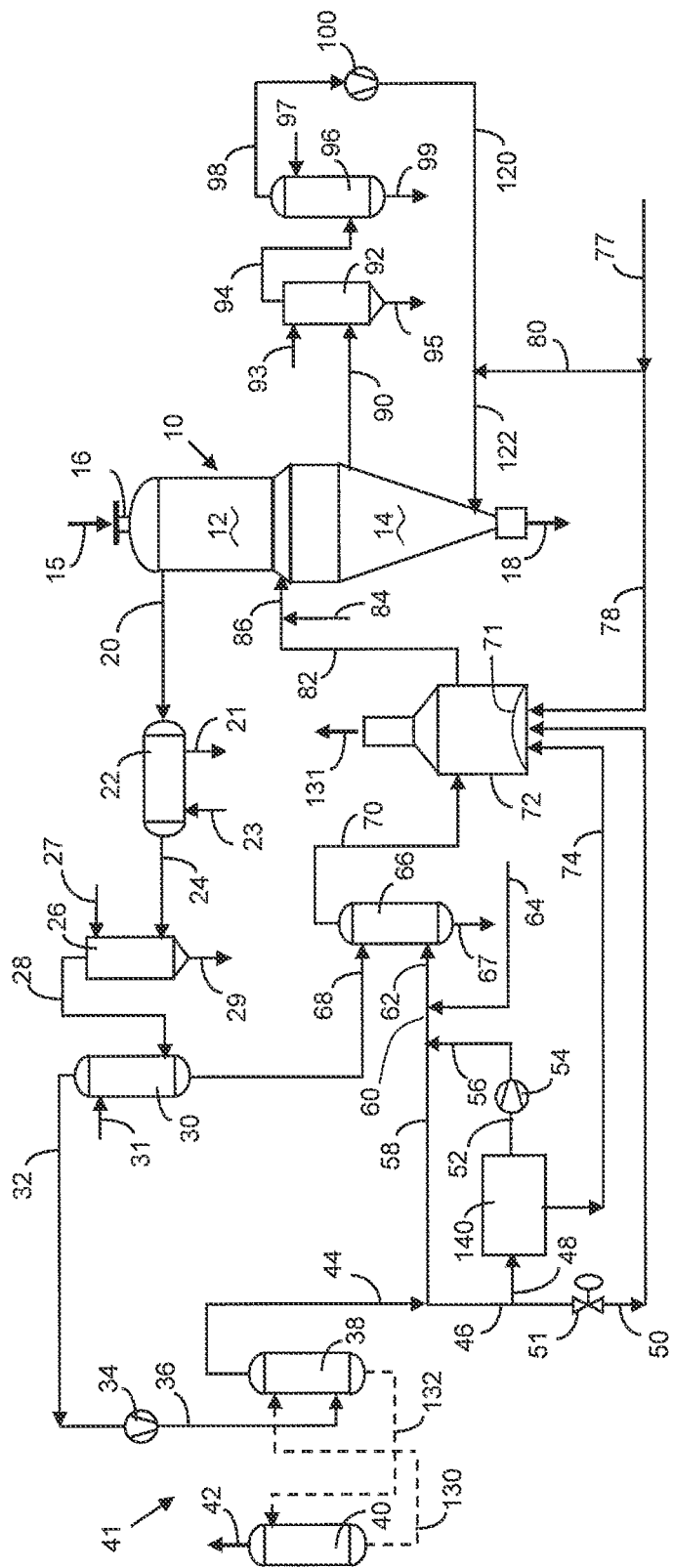
FIG. 2 shows a process diagram of a direct reduction process similar to FIG. 1, modified to incorporate the present invention.

Referring now to FIG. 2, showing a preferred embodiment of the invention, the upgraded reducing gas effluent 44 from the selective carbon dioxide removal unit 41 (illustrated as comprising the $CO_2$ chemical absorption unit 38/40) is subsequently divided into two streams. A first stream 58 is directed to humidifier 66 and eventually is recycled to the reduction zone 12 of reactor 10, while a second stream 46 is further split into two portions. In particular, a first portion 48 is treated in a physical adsorption unit 140 of the PSA (pressure swing adsorption) type for separation of the gases of large molecules, mostly carbon monoxide and methane from the lighter molecules contained in said gas stream e.g. hydrogen, nitrogen and water. Therefore, a hydrogen rich stream 74 is produced and subsequently fed as fuel to burners 71 of heater 72. A small second portion 50 of stream 46 is purged from the system as tail gas regulated by valve 51 and is burned in the process gas heater 72. This purged gas 50 could essentially be zero when there is no accumulation of inert elements like nitrogen in the process reducing gas. Finally, an additional small stream of pure natural gas 78 is burned in the heater only for the purpose of making a visible flame at the burners 71 for visual monitoring.

The remaining portion of stream 48, after being dehydrogenated, is removed from the PSA unit 140 as stream 52 mainly composed of CO and $CH_4$ and is subsequently compressed by compressor 54 before being added directly to the upgraded recycled gas stream 58 coming from absorber column 38. Compressed stream 56, after being combined with upgraded reducing gas 58 as stream 60 and further combined with the make-up stream of natural gas 64 to form stream 62 is fed to humidifier 66 where its water content is adjusted so that the amount of water present ranges between 3% and 10% by volume of stream 70, as described above. According to a principle of the invention, an important portion of the natural gas 78 normally fed to the burners 71 of heater 72 is substituted by hydrogen 74 withdrawn from the process and a similar amount is injected into the process as stream 64 to maintain the overall mass balance. The final result is that the $CO_2$ related to the reaction of carbon in the natural gas passes through the process circuit almost completely and is therefore all treated in the $CO_2$ absorption system, maximizing in this way the selective $CO_2$ collection and avoiding its direct emission to the atmosphere.

With the substitution of natural gas for hydrogen in the gas heater, the amount of $CO_2$ emitted to the atmosphere is on the order of 68 kg per metric ton of DRI, representing a reduction of the $CO_2$ emissions to the atmosphere through the heater stack 131 as compared with the prior art process of FIG. 1.

FIG. 3 shows another embodiment of the invention, wherein the DRI produced in reactor 10 is discharged from the lower zone 14 of the reactor at high temperature, on the order of 400° C. to 750° C., and therefore the cooling gas circuit elements are deactivated (or eliminated, as illustrated). The rest of the process and equipment is similar to the embodiment of FIG. 2.

Figure 4:
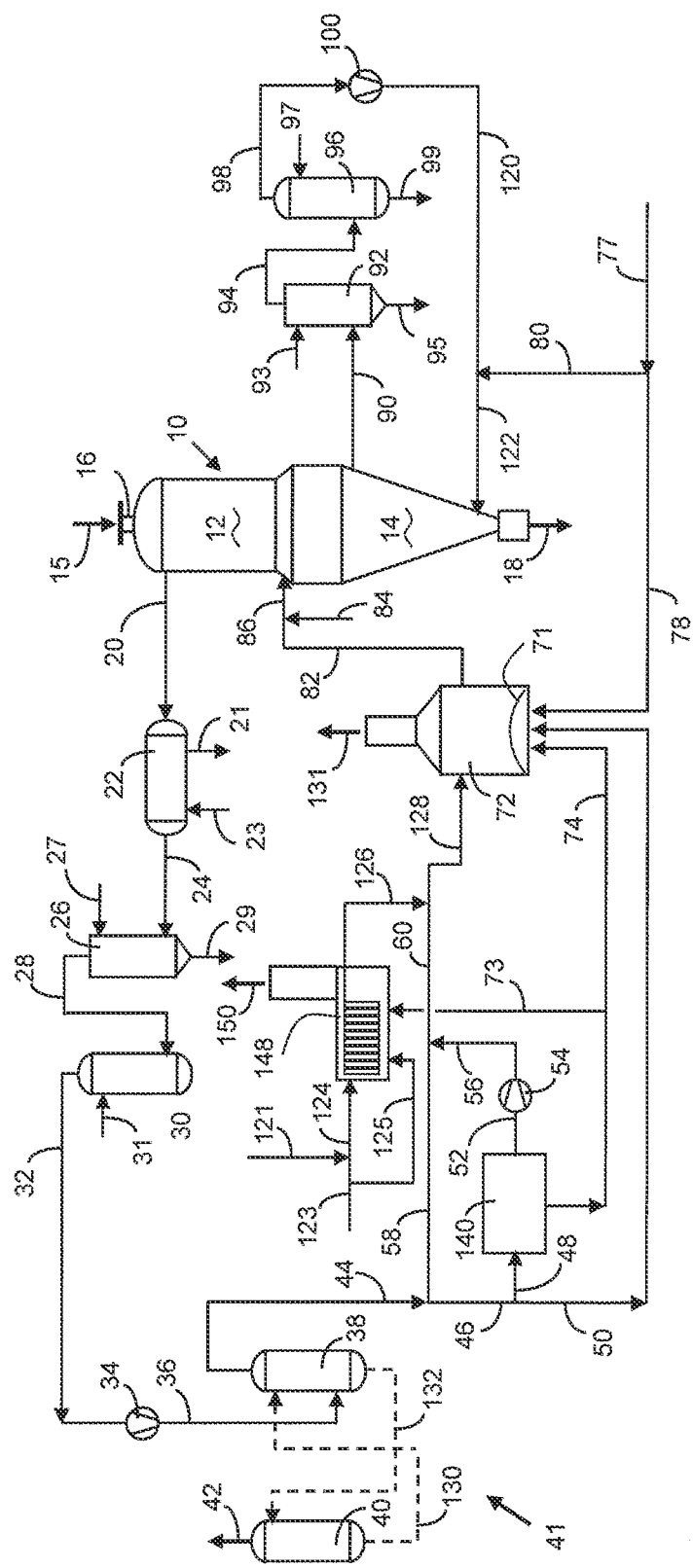
FIG. 4 shows a process diagram of a direct reduction process incorporating yet another embodiment of the invention, wherein a hydrocarbon-steam reformer is incorporated for producing the make-up reducing gas.

Referring now to FIG. 4, in this embodiment, the invention is incorporated in a direct reduction plant with an external catalytic reformer 148 wherein natural gas 123 and steam 121, combined as stream 124, are reformed to produce a reducing gas 126, which is subsequently combined with the previously upgraded reducing gas stream 60 forming a reducing gas stream 128. The reducing gas stream 128 is finally fed to the reactor after being heated in heater 72, where it reaches a temperature around 900° C. The rest of the process is similar to that described in relation to the embodiment of FIG. 2.

The presence of the external catalytic reformer involves mainly the necessity to recover, from the upgraded reducing gas stream, the amount of hydrogen required to be fed not only to the heater as stream 74, but also to the reformer burners as stream 73. As a consequence, the volume of reducing gas 48 that has to be treated in the PSA unit is higher in comparison with the same stream for the case of a Zero Reformer plant of FIG. 2. The natural gas 123 can also be fed to the reformer burners (as stream 125).

Figure 5:
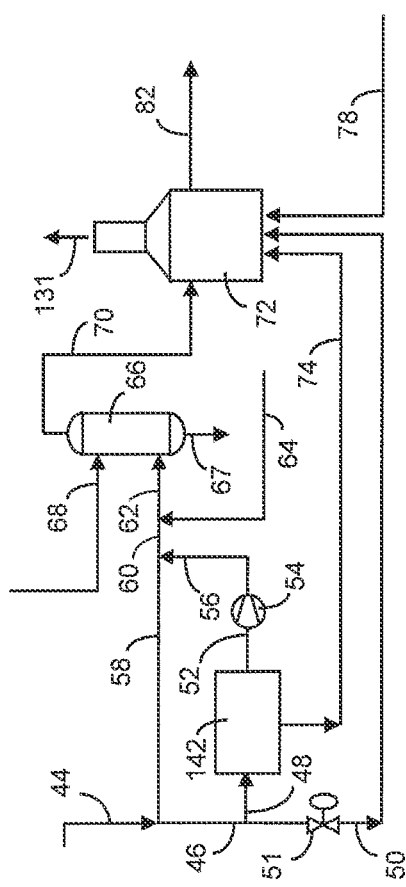
FIG. 5 shows a portion of the process diagram of a direct reduction process, similar to FIG. 2 or 3, incorporating another embodiment of the invention wherein a hydrogen separation membrane is used instead of a PSA unit.

With reference to FIG. 5, a hydrogen separation membrane 142 can be used instead of a PSA/VPSA unit. The principle of operation of a membrane system is different from the operation of a PSA/VPSA unit. Membrane systems permeate fast-moving gas components such as $H_2$ and $CO_2$ to a low-pressure effluent gas stream and keep lower components such as CO, $CH_4$ and $N_2$ at high pressure. A booster compressor 54 is therefore also required to compress the hydrogen-lean gas so as to be recycled back to the reduction gas circuit. Although membrane systems have a lower selectivity of $H_2$ with respect to CO, they have the advantage of a lower compression cost.

Figure 6:
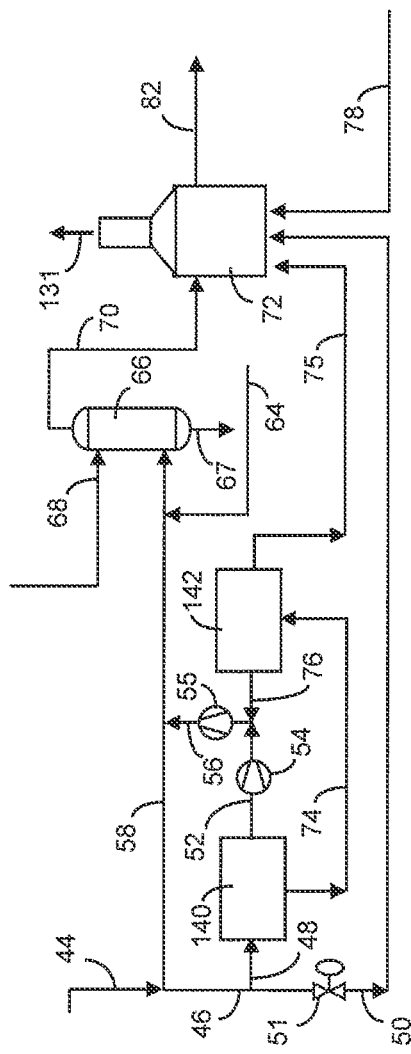
FIG. 6 shows a portion of the process diagram of a direct reduction process, similar to FIG. 2 or 3, incorporating still another embodiment of the invention wherein a hydrogen separation membrane is used in combination with a PSA unit.

Referring now to FIG. 6, wherein a combination of a PSA/VPSA unit 140 and a separation membrane system 142 are used for hydrogen separation, the high pressure CO-Jean gas stream 74 effluent from PSA/VPSA unit 140, is fed to a membrane system 142 producing a low-pressure $H_2$ rich gas stream 75, which is used as fuel in heater 72, and a higher pressure $H_2$-lean gas stream 76. The $H_2$-lean gas stream 52 from PSA/VPSA unit 140 is compressed through compressor 54 and combined with stream 76 effluent from membrane system 142 and the combined stream is compressed by compressor 55 to be recycled back to the reduction gas circuit as stream 58.

Optionally, the DRI can be discharged at high temperature (see FIG. 3) on the order of 400° C. to 750° C. and subsequently hot briquetted or pneumatically transported to a steelmaking furnace in a manner know in the art.

As a further alternative, the reformed gas could be substituted by a synthetic gas (produced by gasification of coal or oil) or by off-gas of other plants (like coke oven gas) containing species like CO, $H_2$ and $CH_4$. The method disclosed by this patent is applicable for any kind of make up gas, regardless of whether it is natural gas or reformed gas or synthetic gas or any such gas containing CO, $CH_4$ and $H_2$.

The amount of $CO_2$ emitted to the atmosphere through the heater stack 131 may increase; if more hydrocarbon gas 64, for example natural gas, is fed to the reduction circuit or to the cooling circuit (via 80), for the purpose of producing a greater amount of hydrogen 74 (as fuel for the heater). However, this increase in hydrocarbon gas circulating in the reduction circuit will demand a corresponding increase in the consumption of oxygen 84 (needed to supply the energy to drive the reformation reactions that yield the extra hydrogen derived from such extra hydrocarbon gas). Conversely, if the need for hydrogen is less, then amount of hydrocarbon gas 64 and of oxygen 80 and $CO_2$ will also be less.

EXAMPLE

The following table shows the respective composition and flows of the relevant gas streams as calculated for a direct reduction process embodying the present invention. The gas streams are identified by the numerals shown in FIGS. 1 and 2. Flow rates and compositions were calculated for a plant without an external reformer producing 220 Tons of DRI/hr with 94% Metallization (% of metallic iron to total iron) and 3.5% carbon.

1,631 NCM/Ton DRI of reacted reducing gas (stream 20), after removal of water in cooler 30 and having about 10% volume of $CO_2$, is treated in the $CO_2$ chemical absorption unit 38 where its $CO_2$ content is decreased to about 1.5% by volume. A portion of this regenerated gas is recycled to reactor 10 as stream 58 and another portion thereof (stream 46) with such a decreased content of $CO_2$ is treated in PSA unit 140 producing a fuel stream 74 of a high hydrogen content and a carbon-compounds-laden stream 56 which is recycled to the reduction loop (into stream 58) so that the $CO_2$ will flow through the recycle loop to be absorbed in unit 38 instead of being emitted from the heater stack as stream 131. While natural gas fed to the lower part of the reactor for DRI cooling (stream 80) is the same compared to the prior art, the natural gas stream fed to the reduction loop (stream 64) is increased, because it will be transformed to hydrogen and eventually be burned in heater 72.

TABLE 1

Prior Art (FIG. 1)

| | Stream No. | | | |
| --- | --- | --- | --- | --- |
| | 44 | 33 | 64 | 80 |
| Flow per ton of DRI (NCM) | 1,289 | 127 | 126 | 91 |
| Composition % Vol | | | | |
| $H_2$ | 57.442 | 52.192 | | |
| CO | 12.377 | 11.246 | | |
| $CO_2$ | 1.500 | 10.224 | 1.580 | 1.580 |
| $CH_4$ | 26.992 | 24.525 | 88.120 | 88.120 |
| $N_2$ | 1.089 | 0.990 | 0.560 | 0.560 |
| $H_2O$ | 0.599 | 0.824 | | |
| Heavier Hydrocarbons | | | 9.740 | 9.740 |

$CO_2$ emitted through Stack (131) = 169 Kg/ton of DRI

TABLE 1-continued

Invention (FIG. 2)

| | Stream No. | | | | | |
|---|---|---|---|---|---|---|
| | 44 | 74 | 56 | 50 | 64 | 80 |
| Flow per ton of DRI (NCM) | 1,450 | 166 | 235 | 31 | 136 | 91 |
| Composition % Vol | | | | | | |
| $H_2$ | 54.023 | 98.000 | 23.025 | 54.023 | | |
| CO | 15.405 | 1.300 | 25.347 | 15.405 | | |
| $CO_2$ | 1.500 | | 2.557 | 1.500 | 1.580 | 1.580 |
| $CH_4$ | 24.182 | 0.700 | 40.734 | 28.182 | 88.120 | 88.120 |
| $N_2$ | 4.276 | | 7.290 | 4.276 | 0.560 | 0.560 |
| $H_2O$ | 0.614 | | 1.046 | 0.614 | | |
| Heavier Hydrocarbons | | | | | 9.740 | 9.740 |

$CO_2$ emitted through Stack (131) = 68 Kg/ton of DRI

A carbon balance (comparing the prior art and the invention) is as follows:

carbon fed to the DR plant in Kg of $CO_2$ per Metric Ton of DRI produced:

| | Prior art (FIG. 1) | Invention |
|---|---|---|
| Natural Gas to Reduction circuit (stream 64) | 285 | 308 |
| Natural Gas to Cooling circuit (80) | 208 | 208 |
| Natural Gas to process gas heater (78) | 54 | 36 |
| Total Carbon equivalent to $CO_2$ fed to the Plant | 547 | 552 |

Carbon withdrawn from the DR plant in Kg of $CO_2$ per Metric Ton of DRI produced:

| | Prior art (FIG. 1) | Invention (FIG. 2) |
|---|---|---|
| Carbon in DRI (18) | 128 | 128 |
| $CO_2$ controlled removal via selective stream (42) | 250 | 356 |
| $CO_2$ emitted uncontrolled to the atmosphere via stack (131) | 169 | 68 |
| Total Carbon equivalent to $CO_2$ withdrawn from the plant | 547 | 552 |

If the above example is run for an embodiment of the invention as applied to a plant having no cooling loop (as shown in FIG. 3) or having an external catalytic steam-hydrocarbon reformer 148, the values and compositions of gas streams will change but essentially the amount of $CO_2$ removed in the chemical absorption unit 38 will be similar and the amount of $CO_2$ emitted to the atmosphere, through stacks 131 of the heater 72 and 150 of the reformer 148 will be considerably decreased, providing the advantages and benefits of the invention. It is of course to be understood that the embodiments of the invention herein described are included only as illustrative; that numerous changes can be made thereto according to any particular application of the invention, which is defined by the scope of the following claims.

What is claimed is:

1. A method of producing direct reduced iron, DRI, in a direct reduction system comprising
    a moving bed reduction reactor with a reduction zone and a lower discharge zone,
    a gas cooling unit,
    a selective carbon dioxide removal unit and
    a reducing gas heater,
wherein iron-oxide containing particles are reduced in said moving bed reduction reactor to DRI containing metallic iron,
    by reaction at an iron oxide reducing temperature with a reducing gas mainly composed of hydrogen and carbon monoxide derived from a hydrocarbon-containing gas;
wherein spent gas effluent from said reactor comprising hydrogen, carbon monoxide, carbon dioxide, methane and water is cleaned and cooled in said gas cooling unit,
    whereby water is condensed and withdrawn from said spent gas, and
wherein said cleaned and cooled reducing gas is treated in said selective carbon dioxide removal unit
    producing a stream of almost pure carbon dioxide which can be controllably withdrawn from the reduction plant; thus producing an upgraded reducing gas, mainly comprised of hydrogen, carbon monoxide and methane; and
wherein a first portion of said upgraded reducing gas is recycled to said reactor after being heated in said reducing gas heater,
    said method comprising
        treating a second portion of said upgraded reducing gas in a physical gas separation unit to produce
            a first gas stream having a higher concentration of hydrogen and
            a second gas stream having a higher concentration of carbon monoxide and methane;
        using said first gas stream as fuel in said reducing gas heater, and
        recycling said second gas stream to said direct reduction system to eventually be treated in said selective carbon dioxide removal unit,
whereby combustion of the first gas stream containing hydrogen in the reducing gas heater, in substitution of carbon-bearing fuels, decreases emission of carbon dioxide to the atmosphere.

2. A method of producing DRI according to claim 1, wherein said selective carbon dioxide removal from the spent gas effluent from the reduction reactor is carried out by chemical absorption in a suitable solvent.

3. A method of producing DRI according to claim 2, A method of producing DRI according to claim 1, wherein said physical gas separation unit is a pressure swing adsorption, PSA or a vacuum pressure swing adsorption, VPSA, unit.

4. A method of producing DRI according to claim 3, wherein said physical gas separation unit is a membrane unit for differentiated permeation of gases.

5. A method of producing DRI according to claim 2, wherein said physical gas separation unit is a membrane unit for differentiated permeation of gases.

6. A method of producing DRI according to claim 1, wherein said physical gas separation unit is a pressure swing adsorption, PSA or a vacuum pressure swing adsorption, VPSA, unit.

7. A method of producing DRI according to claim 1, wherein said physical gas separation unit is a membrane unit for differentiated permeation of gases.

8. A method of producing DRI according to claim 1, wherein said hydrocarbon containing gas is natural gas.

9. A method of producing DRI according to claim 1, further comprising cooling said DRI in the lower discharge zone of said reactor by contact of the DRI with a gas stream of cooling gas.

10. A method of producing DRI according to claim 1, further comprising reforming a hydrocarbon-containing gas in a reformer and feeding reducing gas produced by said reformer to said reduction system.

11. A method of producing DRI according to claim 10, wherein said reformer has burners and part of said first gas stream having a higher concentration of hydrogen is fed to said reformer burners.

12. A method of producing DRI according to claim 1, wherein the reducing temperature is in the range of 750 to 1100° C.

13. A method of producing DRI according to claim 12, further comprising reforming a hydrocarbon-containing gas in a reformer and feeding reducing gas produced by said reformer to said reduction system.

14. An apparatus for producing direct reduced iron, DRI, in a direct reduction system comprising
a moving bed reduction reactor with a reduction zone and a lower discharge zone,
a gas cooling unit,
a selective carbon dioxide removal unit, and
a reducing gas heater, all connected together to form
a reducing gas recycle loop,
said reducing gas heater having burners,
said reactor being capable of use for the reduction of iron-oxides-containing particles to DRI containing metallic iron, by reaction with a high temperature reducing gas mainly composed of hydrogen and carbon monoxide derived from a hydrocarbon-containing gas;
said gas cooling unit being capable of cleaning and cooling spent gas effluent from said reactor comprising hydrogen, carbon monoxide, carbon dioxide, methane and water, whereby water is condensed and withdrawn from said spent gas;
said selective carbon dioxide removal unit being capable of treating such cleaned and cooled reducing gas to produce a stream of almost pure carbon dioxide which can be controllably withdrawn from the reduction plant, thus producing an upgraded reducing gas, mainly comprised of hydrogen, carbon monoxide and methane;
said reducing gas heater being capable of heating a first portion of said upgraded reducing gas to be recycled via said recycle loop back into said reactor after being heated; and
a gas source capable of supplying hydrocarbon-containing gas available to be reformed to $H_2$ and CO as make up gas;
said apparatus comprising
a physical gas separation unit capable of separating a gas containing carbon monoxide, methane, and hydrogen into separate streams of gas with a first stream having a higher concentration of hydrogen and a second stream having a higher concentration of carbon monoxide and methane and being connected to said reducing gas recycle loop between said selective carbon dioxide removal unit and said reducing gas heater and thus being capable of receiving and treating a second portion of said upgraded reducing gas from said reducing gas recycle loop to produce the first gas stream and the second gas stream;
said physical gas separation unit being connected to the burners of said reducing gas heater to be capable of supplying said first gas stream as fuel to said burners, and
said physical gas separation unit being connected back to said reducing gas recycle loop to be capable of recycling said second gas stream back into said reducing gas recycle loop towards said reducing gas heater to eventually be treated in said selective carbon dioxide removal unit, whereby the combustion of said hydrogen-containing first gas stream in the process gas heater in substitution of carbon-bearing fuels, decreases the carbon dioxide emissions to the atmosphere of said reduction plant.

15. An apparatus for producing DRI according to claim 14, wherein said selective carbon dioxide removal unit is a chemical absorption unit.

16. An apparatus for producing DRI according to claim 14, wherein said physical gas separation unit is a pressure swing adsorption, PSA, or a vacuum pressure swing adsorption, VPSA, unit.

17. An apparatus of producing DRI according to claim 14, wherein said physical gas separation unit is a membrane unit for differentiated permeation of gases.

18. An apparatus for producing DRI according to claim 14, wherein said hydrocarbon-containing gas is natural gas.

19. An apparatus for producing DRI according to claim 14, further comprising a DRI cooling loop formed of the lower discharge zone of said reactor being connected with a gas cooler/cleaner and compressor means for circulating a cooling gas stream through said lower discharge zone for cooling said DRI.

20. An apparatus for producing DRI according to claim 14, further comprising a hydrocarbon-containing gas reformer being connected to said gas source and hydrocarbon-containing gas being further connected to said reducing gas recycle loop to be capable of feeding thereto reformed gas containing mainly CO and H2.

21. An apparatus for producing DRI according to claim 20, wherein said gas reformer has burners, and said physical gas separation unit is connected to the burners of said reformer for supplying part of said first gas stream as fuel.

22. An apparatus for producing DRI according to claim 14, further comprising a humidifier connected in said reducing gas recycle loop after said $CO_2$ removal unit, and said gas source being connected to said reducing gas recycle loop adjacent said humidifier.

\* \* \* \* \*